United States Patent
Ramani et al.

(10) Patent No.: US 7,822,951 B2
(45) Date of Patent: Oct. 26, 2010

(54) SYSTEM AND METHOD OF LOAD-STORE FORWARDING

(75) Inventors: Krishnan Ramani, Cupertino, CA (US); Gary Lauterbach, Los Altos, CA (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 430 days.

(21) Appl. No.: 11/832,303

(22) Filed: Aug. 1, 2007

(65) Prior Publication Data

US 2009/0037697 A1 Feb. 5, 2009

(51) Int. Cl.
*G06F 9/38* (2006.01)
(52) U.S. Cl. ...................................................... 712/218
(58) Field of Classification Search .................. None
See application file for complete search history.

(56) References Cited

U.S. PATENT DOCUMENTS

| | | | |
|---|---|---|---|
| 5,619,662 A | | 4/1997 | Steely, Jr. et al. |
| 5,764,946 A | * | 6/1998 | Tran et al. .................... 712/239 |
| 5,781,752 A | | 7/1998 | Moshovos et al. |
| 6,122,727 A | | 9/2000 | Witt |
| 6,212,622 B1 | | 4/2001 | Witt |
| 6,212,623 B1 | | 4/2001 | Witt |
| 6,405,305 B1 | | 6/2002 | Meier et al. |
| 6,694,424 B1 | * | 2/2004 | Keller et al. ................. 712/216 |
| 6,845,442 B1 | * | 1/2005 | Lepak et al. ................. 712/214 |
| 6,928,534 B2 | * | 8/2005 | Yeluri ........................ 712/225 |
| 7,590,825 B2 | * | 9/2009 | Krimer et al. ............... 712/216 |
| 2002/0188829 A1 | * | 12/2002 | Senter et al. ................. 712/218 |
| 2004/0044881 A1 | * | 3/2004 | Maier et al. ................. 712/218 |

* cited by examiner

*Primary Examiner*—Eric Coleman
(74) *Attorney, Agent, or Firm*—Rory D. Rankin; Meyertons, Hood, Kivlin, Kowert & Goetzel, P.C.

(57) ABSTRACT

A system and method for data forwarding from a store instruction to a load instruction during out-of-order execution, when the load instruction address matches against multiple older uncommitted store addresses or if the forwarding fails during the first pass due to any other reason. In a first pass, the youngest store instruction in program order of all store instructions older than a load instruction is found and an indication to the store buffer entry holding information of the youngest store instruction is recorded. In a second pass, the recorded indication is used to index the store buffer and the store bypass data is forwarded to the load instruction. Simultaneously, it is verified if no new store, younger than the previously identified store and older than the load has not been issued due to out-of-order execution.

17 Claims, 5 Drawing Sheets

SYSTEM AND METHOD OF LOAD-STORE FORWARDING

BACKGROUND OF THE INVENTION

1. Field of the Invention

This invention relates to microprocessors, and more particularly, to a method of data forwarding from a store instruction to a load instruction during out-of-order execution.

2. Description of the Relevant Art

In modern microprocessors, one or more processor cores, or processors, may be included in the microprocessor, wherein each processor is capable of executing instructions of a software application. Modern processors are pipelined, or the processors are comprised of one or more data processing stages connected in series wherein storage elements are placed between the stages. The output of one stage is made the input of the next stage during each transition of a clock signal. Level-sensitive latches may be used as storage elements in a pipeline at a phase-boundary, or a portion of a clock cycle. Edge-sensitive flip-flops may be used as storage elements in a pipeline at a cycle boundary. The amount of execution of an instruction performed within a pipeline stage is referred to as the amount of execution performed by integrated circuits between clock cycle boundaries. Ideally, every clock cycle produces useful execution for each stage of the pipeline.

At times, a data dependency stall occurs between two instructions where an instruction's operand depends on the results of a preceding instruction. A stall can be avoided if the result of the preceding instruction is ready for data forwarding from one pipeline stage to another. The dependent instruction does not need to wait for the result to be written and subsequently read from a register file.

To further increase performance, modern microprocessors may perform multiple issue, dispatch, and retirement of instructions per clock cycle. Also the microprocessor may execute instructions of a software program in a different sequence than the in-order sequence they appear in the program. The retirement of the instructions would remain in-order so that the architecture state would be valid in the case of an interrupt. Data forwarding logic may become more complex and require more computational time due to out-of-order execution of multiple instructions per clock cycle.

Memory accesses, which comprise load and store instructions, are one of the types of instructions that a microprocessor executes. A load instruction accesses a memory location and may copy the contents to a register in a register file, reservation station, and/or a re-order buffer. A store instruction copies the contents of an on-chip register and writes the contents to a memory location. The memory may be a L1, L2, or L3 cache, system memory such as RAM for a single processor or a group of processors in a processing node of a network, or the memory may be a hard disk in a computer system. Access time of a memory may require substantially more time than an access time of an on-chip queue. Therefore, a load-store queue may be included on-chip of a microprocessor and it may hold data values of uncommitted load and store instructions.

When a load instruction is dispatched in order to be executed, its address may be compared to all addresses in the store queue or buffer. This queue holds uncommitted store instructions. The data value that the load instruction needs may be in the store queue, rather than in a cache or other memory. Multiple entries in the store queue may have a matching address for the load instruction due to out-of-order execution. In order to know which entry in the store queue has the needed forwarding data value, a priority encoder may be used to identify the youngest of the older (program order) uncommitted store entries.

The store to load forwarding (STLF) path may be one of the critical timing paths on a processor core. The addition of a priority encoder in the STLF path increases the timing requirement for this path and ultimately, may set a limit on the maximum operating frequency of the processor core. Computing performance may then begin to suffer.

In view of the above, an efficient method for achieving data forwarding from a store instruction to a load instruction during out-of-order execution is desired.

SUMMARY OF THE INVENTION

Systems and methods for achieving efficient data forwarding from a store instruction to a load instruction during out-of-order execution are contemplated.

In one embodiment, a method is provided to receive load and store instructions that may require forwarding of store data to the load instruction. The forwarding may be made more efficient if in a first clock cycle, the correct store instruction corresponding to the load instruction is found and an indication to the store instruction is recorded, and, in a second clock cycle, the store bypass data is forwarded using the indication of the store instruction to the load instruction. Although the store bypass data is forwarded in a later clock cycle, other out-of-order instructions may execute. The latency between executing a load instruction and forwarding needed data in a store buffer may be hidden.

In another aspect of the invention, a computer system is provided comprising a processor and a memory. The processor may be configured to receive machine language instructions for load and store operations. The processor may comprise a load-store unit to store information of uncommitted load and store instructions. The data needed by an uncommitted load instruction dependent on a previous store instruction may not reside in memory. The store instruction may be uncommitted and the needed bypass data still resides in the load-store unit. The load-store unit may use the address of the load instruction to find the needed store instruction and record an indication of the store instruction. At a later time, the indication may be used to select the needed bypass data.

In still another aspect of the invention, a load-store unit of a processor may comprise a load buffer, a store buffer, and a priority encoder. An uncommitted load instruction in a load buffer may be chosen to execute by a reservation station, a dispatch unit, or other, in a processor. The load instruction address is sent to a store buffer where the address may be compared to an address in each entry of the store buffer. All entries that have an address match may have corresponding information sent to a priority encoder. The priority encoder may be configured to select the youngest store instruction of all store instructions older than the load instruction in program order. The store buffer index of the youngest store instruction may be recorded in an entry of the load buffer corresponding to the load instruction. Additionally, the load instruction may be set to retry in a later clock cycle. In the later clock cycle, when the load instruction is chosen again to execute, the retry status may direct the recorded index to be used to select the entry of the store buffer where the previously chosen youngest store instruction resides. The corresponding data of this store buffer entry may be read out and forwarded to the load instruction. By splitting the operations of finding the required store instruction in the store buffer and actually reading out the required data, the clock cycle may be reduced and performance of the processor may increase.

While the invention is susceptible to various modifications and alternative forms, specific embodiments are shown by way of example in the drawings and are herein described in detail. It should be understood, however, that drawings and detailed description thereto are not intended to limit the invention to the particular form disclosed, but on the contrary, the invention is to cover all modifications, equivalents and alternatives falling within the spirit and scope of the present invention as defined by the appended claims.

DETAILED DESCRIPTION

Figure 1:
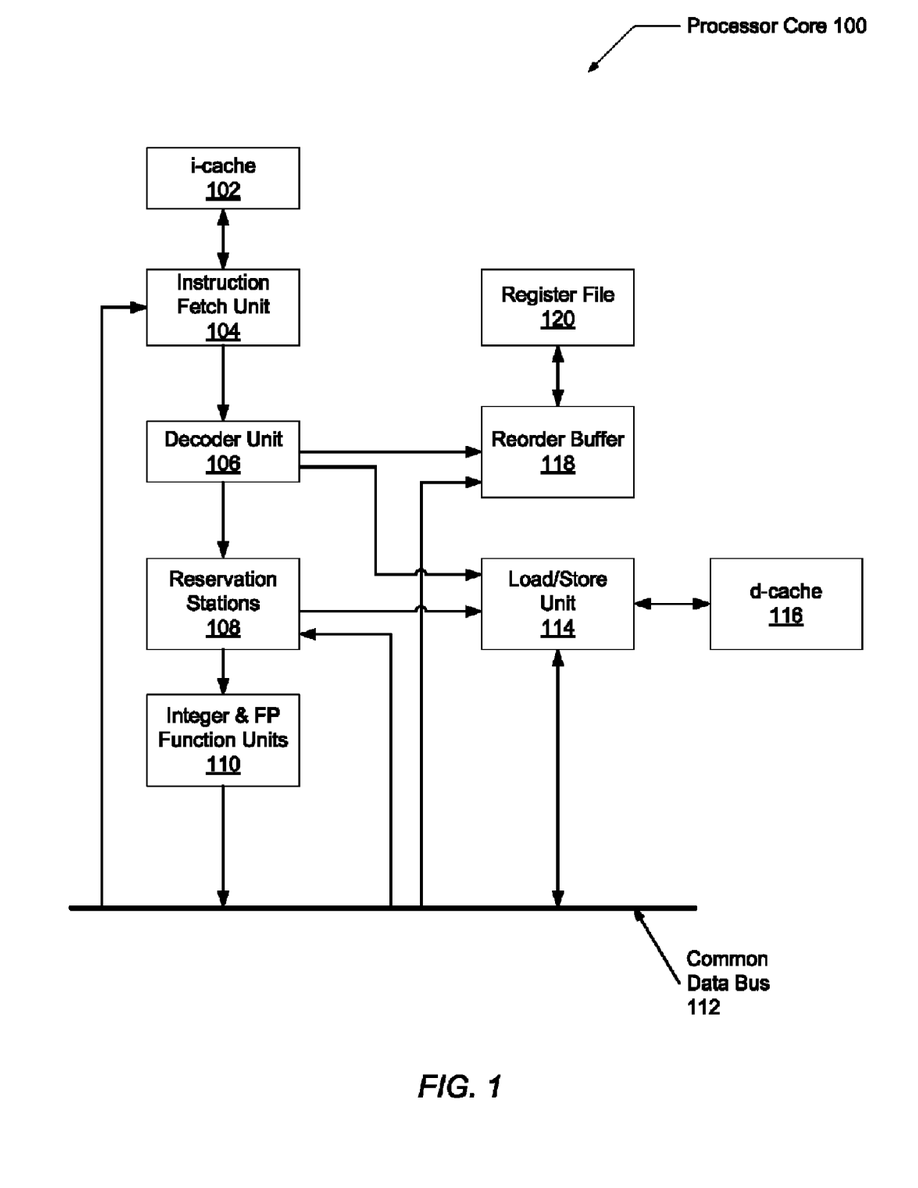
FIG. 1 is a generalized block diagram illustrating one embodiment of a processor core capable of out-of-order execution.

Referring to FIG. 1, one embodiment of a processor core 100 that performs out-of-order execution is shown. An instruction-cache (i-cache) 102 may store instructions for a software application. The instruction fetch unit (IFU) 104 may fetch multiple instructions from the i-cache 102 per clock cycle if there are no i-cache misses. The IFU 104 may include a program counter that holds a pointer to an address of the next instructions to fetch in the i-cache 102. The IFU 104 may also include a branch prediction unit to predict an outcome of a conditional instruction prior to an execution unit determining the actual outcome in a later pipeline stage.

The decoder unit 106 decodes the opcodes of the multiple fetched instructions and may allocate entries in an in-order retirement queue, such as reorder buffer 118, in reservation stations 108, and in a load/store unit 114. The allocation of entries in the reservation stations 108 is considered dispatch. The reservation stations 108 may act as an instruction queue where instructions wait until their operands become available. When operands are available and hardware resources are also available, an instruction may be issued out-of-order from the reservation stations 108 to the integer and floating point functional units 110 or the load/store unit 114. The functional units 110 may include arithmetic logic units (ALU's) for computational calculations such as addition, subtraction, multiplication, division, and square root. Logic may be included to determine an outcome of a conditional instruction. The load/store unit 114 may include queues and logic to execute a memory access instruction. Also, verification logic may reside in the load/store unit 114 to ensure a load instruction received forwarded data, or bypass data, from the correct youngest store instruction. As used herein, forwarded data and bypass data refer to the same data, which is to be sent from the required store instruction to the currently executing load instruction Results from the functional units 110 and the load/store unit 114 may be presented on a common data bus 112. The results may be sent to the reorder buffer 118. Here, an instruction that receives its results, is marked for retirement, and is head-of-the-queue may have its results sent to the register file 120. The register file 120 may hold the architectural state of the general-purpose registers of processor core 100. In one embodiment, register file 120 may contain 32 32-bit registers. Then the instruction in the reorder buffer may be retired in-order and its head-of-queue pointer may be adjusted to the subsequent instruction in program order.

The results on the common data bus 112 may be sent to the reservation stations in order to forward values to operands of instructions waiting for the results. For example, an arithmetic instruction may have operands that depend on the results of a previous arithmetic instruction, or a load instruction may need an address calculated by an address generation unit (AGU) in the functional units 110. When these waiting instructions have values for their operands and hardware resources are available to execute the instructions, they may be issued out-of-order from the reservation stations 108 to the appropriate resources in the functional units 110 or the load/store unit 114. Uncommitted, or non-retired, memory access instructions have entries in the load/store unit. The forwarded data value for an in-flight, or uncommitted, load instruction from the youngest uncommitted older store instruction may be placed on the common data bus 112 or simply routed to the appropriate entry in a load buffer within the load/store unit 114. If no younger store instruction exists in a store buffer of the load/store unit 114, then an in-flight load instruction needs to access the data cache (d-cache) 116 to obtain its needed value. In various embodiments, the store buffer may comprise two buffers where one is a store address buffer and another is a store data buffer. Finally, in one embodiment, results on the common data bus 112 may be routed to the IFU 104 in order to update a branch prediction unit and/or program counter.

Figure 2A:
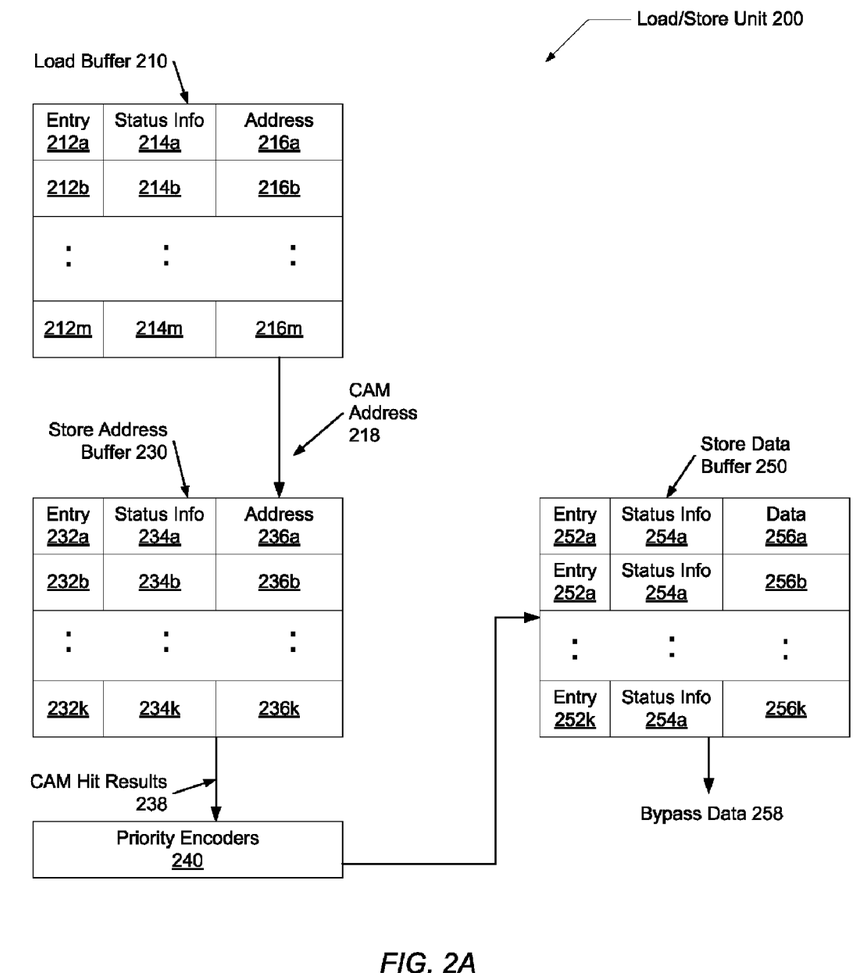
FIG. 2A is a generalized block diagram illustrating one embodiment of a load/store unit.

FIG. 2A illustrates one embodiment of a load/store unit 200. A load buffer 210 may hold an uncommitted load instruction in each entry of the buffer. Each entry may include status information (info) 214a-214m. It is noted that each entry may not have a column holding an entry number such as entry 212a-212m. Rather, the entries may be placed in ascending or descending order and accessed by a decoder routed in a known manner during design of the buffer. The columns are shown here are for purposes of discussion. As used herein, elements referred to by a reference numeral followed by a letter may be collectively referred to by the numeral alone. For example, status info 214a-214m may be collectively referred to as status info 214. The status info 214 of each entry may, for example, include a valid bit, a retry bit, a ready bit, data size, a store data buffer entry, and other information. The address 216 entry may store an address calculated by an AGU in an arithmetic functional unit. When the address 216 is calculated and an entry 212 is set as ready in its status info 214 by a reservation station, the address 216 of the corresponding entry 212 may be presented as a content addressable memory (CAM) address 218 to a store address buffer 230.

In one embodiment, the store address buffer 230 and the store data buffer 250 may be combined in a single buffer. In other embodiments, they may be separated as shown. The store address buffer 230 may have entries structured in a similar manner as the load buffer 210. An entry 232 of the store address buffer 230 may hold an uncommitted store instruction. When the store instruction has its data value written to a data cache, the entry may be cleared or marked invalid within the status info 234. An associative search may then be performed by comparing the CAM Address 218 to each address 236 in each entry 232 of the store address buffer 230. All valid hits 238 are sent to a priority encoder 240. If no valid CAM hit results 238 are found, the load buffer 210 may need to access a data cache to obtain a data value. In one embodiment, multiple load instructions may be executed in one clock cycle. Therefore, multiple CAM addresses 218 may be sent to the store address buffer 230 and multiple CAM hit results 238 may be sent to priority encoders 240. A priority encoder 240 may exist for each load instruction.

If only one valid CAM hit result 238 is sent to a priority encoder 240, then the priority encoder 240 may not need to calculate which CAM hit result corresponds to the youngest store instruction that is older than the corresponding load instruction. Rather, the priority encoder may just need to determine that the CAM hit result 238 is older than the load instruction. Then the corresponding entry number 232 of the store address buffer 230 is sent to the store data buffer 250.

In one embodiment, the store data buffer 250 may be structured similar to the store address buffer with an entry number 252. An entry number 252 of the store address buffer 250 may directly correspond to an entry number 232 of the store address buffer 230. Each entry of the store data buffer 250 may hold a valid data value for an uncommitted store instruction. When the store instruction has its data value written to a data cache, the entry 252 may be cleared or marked invalid within the status info 254.

When the priority encoder 240 sends an entry number 232 to the store data buffer 250, the corresponding entry 252 in the buffer 250 presents its data 256, or it is read out, as the bypass data 258. This data may be sent to a storage element which may be connected to a data bus.

In one embodiment, when multiple valid CAM hit results 238 are sent to a priority encoder 240, the priority encoder 240 may utilize logic to calculate which CAM hit result corresponds to the youngest store instruction that is older than the corresponding load instruction. Once the youngest store instruction is found, the priority encoder 240 sends the single entry number 232 to index the store data buffer 250. The corresponding data 256 is read out of the buffer 250 and may be sent as bypass data 258 to storage elements prior to a common data bus.

A load instruction may be marked for resync and its corresponding status info 214 may be updated accordingly. One reason to mark a load instruction for resync may be to verify that the load instruction received the correct store instruction forwarded data value. If data was forwarded from a store instruction, many clock cycles may have transpired between the time of the forwarding and the time to retire the load instruction. It is possible that a new younger store instruction completed in this time span. When the new younger store instruction executes, an associative search of the load buffer 210 involving a CAM comparison with the store instruction address may occur. If a younger completed load instruction is found, a memory ordering violation has occurred and the load instruction needs to be marked by having its retry bit set in its status info 214.

When a load instruction is marked for resync and it is chosen to re-execute, its address is chosen as CAM address 218 and subsequent operations occur as described above whether a single CAM hit result is found or multiple CAM hit results. In other embodiments, the load/store unit 200 may simultaneously execute two or more load instructions in a clock cycle. For each additional load instruction, additional routing may be needed for the multiple CAM addresses 218, CAM hit results 238, accesses to each of the buffers, etc. Also for each additional load instruction, a priority encoder 240 may be required.

Figure 2B:
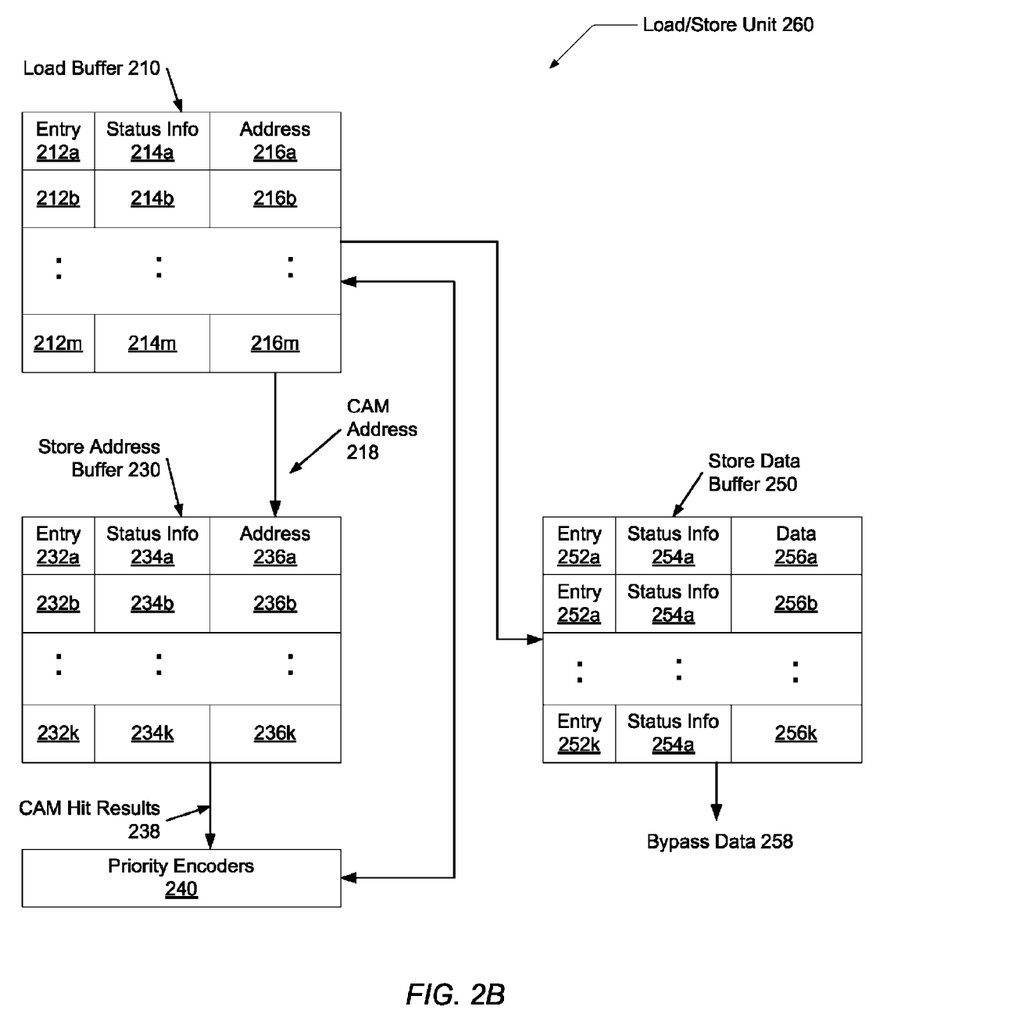
FIG. 2B is a generalized block diagram illustrating another embodiment of a load/store unit.

Referring now to FIG. 2B, another embodiment of a load/store unit 260 is shown. As described above, a load buffer 210 supplies a CAM address 218 of a load instruction selected to execute. After an associative search of the store address buffer 230, one or more CAM hit results may be sent to a priority encoder 240. If no CAM hit results are found, the load buffer 210 may need to access a data cache to obtain the needed data value. In one embodiment, when multiple valid CAM hit results 238 are sent to a priority encoder 240, the priority encoder 240 may need to use age logic to calculate which CAM hit result corresponds to the youngest store instruction that is older than the corresponding load instruction. Regardless if one or multiple valid CAM results are found, once the youngest store instruction is found by the priority encoder 240, the priority encoder 240 may send the single entry number 232 to the load buffer 210. The single entry number 232 may be written to the corresponding status info 214 in the entry 212 that began the CAM address matching and also the retry bit may be set within the corresponding status info 214.

In a later clock cycle, the load instruction may be chosen to execute again, and the actions required for retry described above may be taken. The load instruction has the specific entry number 252 of the store data buffer 250 corresponding to the previously recorded entry number 232 of the store address buffer that contains the address 236 of the youngest of the older uncommitted store instructions. The recorded entry number in the status info 214 of the load buffer 210 may be used to index the store data buffer 250 and the corresponding data 256 may be read out as the required bypass data 258. The bypass data 258 may be presented on a common data bus or to storage elements as described above.

In one embodiment, the update of the status info 214 of the load buffer 210 by the priority encoder 240 and subsequent indexing of the store data buffer 250 by the load buffer 210 may be performed in separate clock cycles. By separating the two operation into different clock cycles, it may be possible to reduce the clock cycle period and increase operating frequency.

Figure 3A:
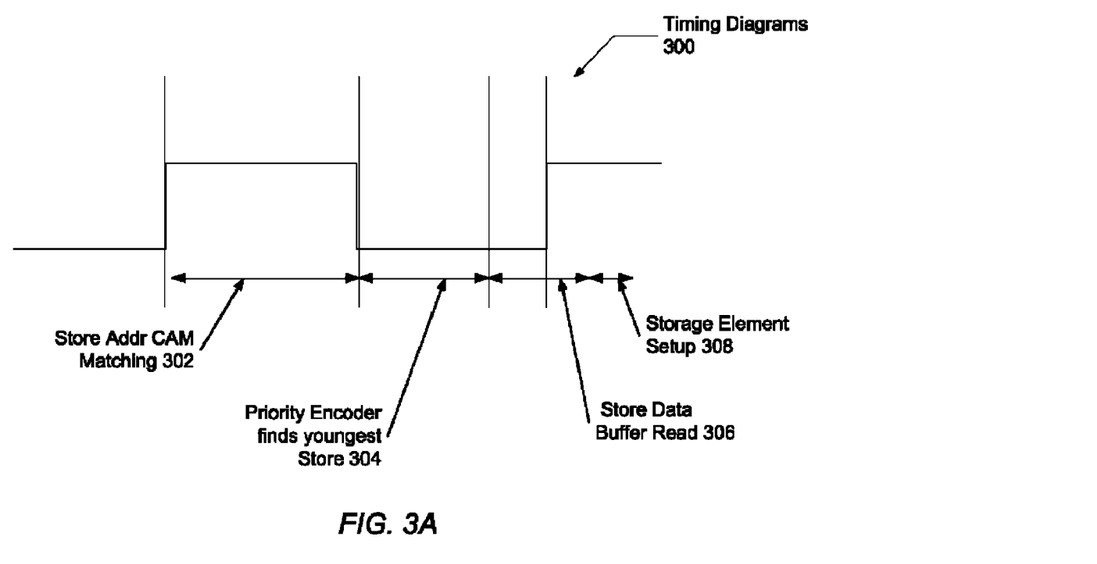
FIG. 3A is a generalized block diagram illustrating one embodiment of a timing diagram of a store to load forwarding path.

FIG. 3A shows one embodiment of a timing diagram 300 for a STLF path. A load instruction may be chosen to execute after its address has been calculated by an AGU. The address may be sent to a store buffer for an associative search. The search may include the use of CAM circuitry in the store buffer and the time required may be shown by CAM matching 302 in the diagram. Multiple valid CAM hits are sent to a priority encoder. The priority encoder may use age logic to calculate which CAM hit result corresponds to the youngest store instruction that is older than the corresponding load instruction. The timing for this step may be represented by a priority encoder finds youngest store 304. In other embodiments, the combination of a CAM operation in the store address buffer followed by a priority encoder determining the youngest store may require more than one clock cycle. Once the youngest store instruction is found, the priority encoder may index a store data buffer, which may have its corresponding data read out from the buffer as shown in 306. Finally, the corresponding data may be sent as bypass data to storage elements prior to a common data bus. A setup time for the storage elements 308 is included in the total time required for the STLF path. This timing diagram may correspond to the operations performed in the block diagram illustrated in FIG. 2A.

Figure 3B:
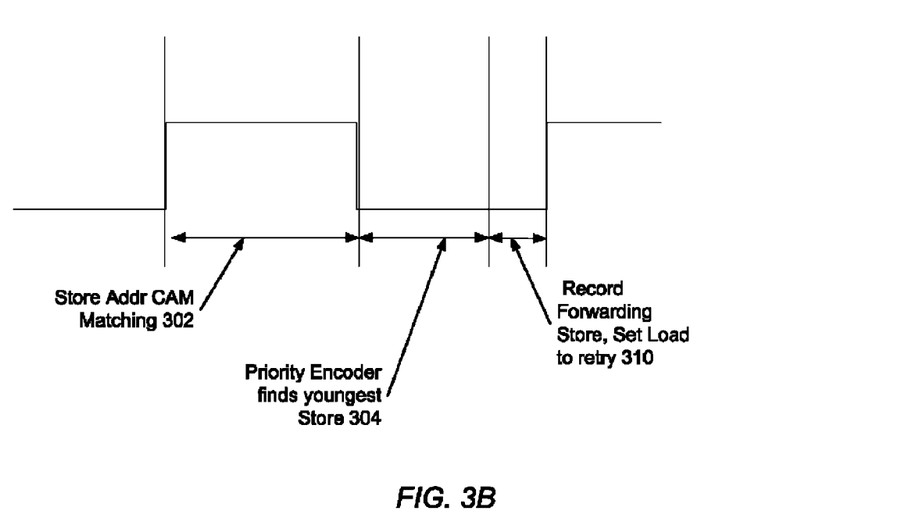
FIG. 3B is a generalized block diagram illustrating another embodiment of a timing diagram of a store to load forwarding path.

Referring to FIG. 3B, an alternative embodiment for a timing diagram 300 for a STLF path is shown. As described above, a load instruction may be chosen to execute and the correct data value, rather than residing in a memory such as a data cache, may be still stored in a store buffer that holds uncommitted store instructions. The combination of a CAM operation in the store address buffer 302 followed by a priority encoder determining the youngest store 304 may occur as described above. The combination of operations may not allow enough time in the remainder of the clock cycle to read out the necessary data value from the store data buffer. In this scenario, timing closure for the chip design may not be met. Here, after the priority encoder determines the correct store instruction to forward from, the corresponding store buffer entry may be written to the status bits of the corresponding load instruction and the retry bit of the corresponding load instruction may be set. The time required for these actions is shown in 310. The actual forwarding of the data value from the store data buffer may be delayed to another clock cycle. The set retry bit of the load instruction may ensure the load instruction is executed again, but on the second execution, the load buffer directly indexes the store data buffer. The address of the load instruction may be sent to the CAM matching circuitry of the store address buffer and priority encoder for verification purposes. This step may require more than one clock cycle, but the forwarded data value may proceed to the common data bus, storage elements, or other. Later, if the forwarded data value is found to be incorrect, it may be marked as invalid in appropriate registers and the load instruction may have its retry bit set again.

Although the forwarded data value may not be utilized until a later clock cycle of the retry of the load instruction, the clock cycle period may be reduced due to the relaxed timing constraint. For a processor that executes multiple instructions out-of-order per clock cycle, the latency of a later forwarding of the data value may be hidden while the clock frequency may be able to increase. This timing diagram may correspond to the operations performed in the block diagram illustrated in FIG. 2B.

Figure 4:
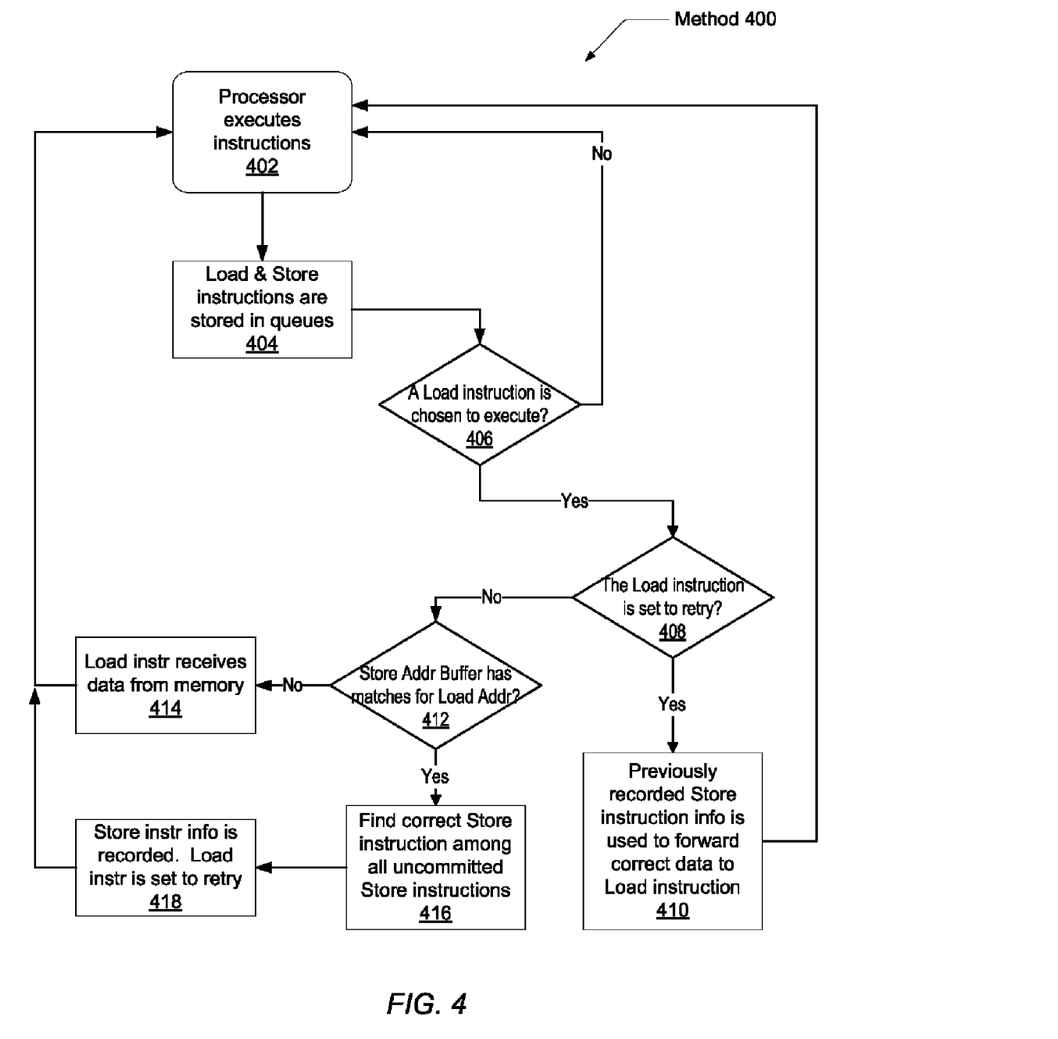
FIG. 4 is a flow diagram of one embodiment of a method for efficient forwarding from a store instruction to a load instruction during out-of-order execution.

FIG. 4 illustrates a method 400 for performing efficient forwarding from a store instruction to a load instruction during out-of-order execution. A processor executes instructions in block 402. Memory access instructions, such as load and store instructions, may be fetched and subsequently stored in queues for out-of-order execution in block 404. After an AGU calculates an address for a load instruction, the load instruction may later be chosen to be executed (decision block 406). If an executing instruction is set to retry (decision block 408), then previously recorded info about a particular store instruction, such as a store buffer entry number, may be used to index a store buffer and read out the corresponding data as bypass data (block 410). The bypass data may be placed on a common data bus and subsequently forwarded to the load instruction and possibly other dependent instructions. In parallel with the indexing of the store data buffer, the address of the load instruction may be sent to CAM matching circuitry of the store address buffer and priority encoder for verification purposes. This step may require more than one clock cycle, but the above bypass data value may proceed to the common data bus, storage elements, or other. Later, if the forwarded data value is found to be incorrect, it may be marked as invalid in appropriate registers and the load instruction may have its retry bit set again.

If the load instruction is not set to retry (decision block 408), then the address of the load instruction may be compared to addresses of all uncommitted store instructions. If there are no address matches (decision block 412), then the load instruction may need to obtain the correct data value from memory, such as a data cache (block 414). If there is one or more successful address matches, the store instruction with the correct data value to forward to the load instruction needs to be found. In one embodiment, the correct store instruction may be the youngest instruction of all older store instructions in program order. In one embodiment, a priority encoder may be used to determine which of the multiple store instructions to use for data forwarding in block 416. Once the correct store instruction is chosen, information to identify the store instruction may be recorded in block 418. This information may include an entry number that corresponds to both a store address buffer and a store data buffer for later indexing. This entry number may already be included in status information for each entry in a load buffer. The corresponding entry in the load buffer may have the field for the store buffer entry written with the chosen value. Also, the load instruction needs to later re-execute, since the correct data value has not yet been forwarded. In order to ensure this requirement, a retry bit field may be set in the corresponding entry in the load buffer. During re-execution, the store data buffer may be indexed by the recorded entry number in order to provide the correct data value for forwarding. Also, verification of the data value may occur simultaneously.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A method for use in processing device, the method comprising:

storing in the processing device at least a retry bit and a store index corresponding to an uncommitted load instruction of a plurality of uncommitted load instructions in an entry of a first plurality of entries;

storing at least bypass data corresponding to an uncommitted store instruction of a plurality of uncommitted store instructions in an entry of a second plurality of entries;

in response to detecting a retry bit stored in a first load entry of the first plurality of entries is not set, comparing a first load address corresponding to a first load instruction of the plurality of uncommitted load instructions to a store address stored in each entry of the second plurality of entries, wherein the first load instruction corresponds to the first load entry; and in response to detecting said retry bit is set:

selecting a first store entry of the second plurality of entries based upon a first store index stored in the first load entry; and forwarding bypass data from the first store entry to the first load instruction.

2. The method as recited in claim 1, further comprising:

determining the first store entry holds a youngest store instruction older than the first load instruction in program order, wherein a store address of the youngest store instruction included within the plurality of uncommitted store instructions matches a first load address of the first load instruction; and setting said retry bit and storing said store index in the first load entry responsive to said determining.

3. The method as recited in claim 2, further comprising:

performing said setting of the retry bit and said storing of the store index in a first clock cycle responsive to said determination; and performing said forwarding of bypass data to the load instruction in a second clock cycle responsive to said detection.

4. The method as recited in claim 2, wherein the store index is an entry number of an entry of the second plurality of entries, and wherein the entry number corresponds to the first store entry.

5. The method as recited in claim 1, further comprising utilizing age information in the second plurality of entries within a priority encoder to determine said youngest store instruction from one or more address matching store instructions, each address matching store instruction having a same address as a first load address corresponding to the first load instruction.

6. A computer system comprising:
a processor comprising a load-store unit; and
a memory coupled to the processor;
wherein the processor is configured to issue load and store operations to the load-store unit;
wherein the load-store unit is configured to:
store at least a retry bit and a store index corresponding to an uncommitted load instruction of a plurality of uncommitted load instructions in an entry of a first plurality of entries;
store at least bypass data corresponding to an uncommitted store instruction of a plurality of uncommitted store instructions in an entry of a second plurality of entries;
in response to detecting a retry bit stored in a first load entry of the first plurality of entries is not set, compare a first load address corresponding to a first load instruction of the plurality of uncommitted load instructions to a store address stored in each entry of the second plurality of entries, wherein the first load instruction corresponds to the first load entry; and
in response to detecting said retry bit is set:
select a first store entry of the second plurality of entries based upon a first store index stored in the first load entry; and
forward bypass data from the first store entry to the first load instruction.

7. The system as recited in claim 6, wherein the load-store unit is further configured to:
set said retry bit and store said store index in the first load entry responsive to determining the first store entry holds a youngest store instruction older than the first load instruction in program order, wherein a store address of the youngest store instruction included within the plurality of uncommitted store instructions matches a first load address of the first load instruction.

8. The system as recited in claim 7, wherein the load-store unit further configured to:
perform said setting of the retry bit and said storing of the store index in a first clock cycle responsive to said determination; and
perform said forwarding of bypass data to the load instruction in a second clock cycle responsive to said detection.

9. The system as recited in claim 7, wherein the store index is an entry number of an entry of the second plurality of entries, and wherein the entry number corresponds to the first store entry.

10. The system as recited in claim 6, wherein the load-store unit is further configured to utilize age information in the second plurality of entries within a priority encoder to determine said youngest store instruction from one or more address matching store instructions, each address matching store instruction having a same address as a first load address corresponding to the first load instruction.

11. A load-store unit comprising:
a load buffer comprising a first plurality of entries, wherein an entry stores at least a retry bit and a store index corresponding to an uncommitted load instruction of a plurality of uncommitted load instructions;
a store buffer comprising a second plurality of entries, wherein an entry stores at least bypass data corresponding to an uncommitted store instruction of a plurality of uncommitted store instructions;
wherein in response to detecting a retry bit stored in a first load entry of the first plurality of entries is not set, the store buffer is configured to compare a first load address corresponding to a first load instruction of the plurality of uncommitted load instructions to a store address stored in each entry of the second plurality of entries, wherein the first load instruction corresponds to the first load entry; and
wherein, in response to detecting said retry bit is set, the store buffer is configured to:
select a first store entry of the store buffer based upon a first store index stored in the first load entry; and
forward bypass data from the first store entry to the first load instruction.

12. The load-store unit as recited in claim 11, wherein the load-store unit further comprises a priority encoder, wherein the priority encoder is configured to:
set said retry bit and store said store index in the first load entry responsive to determining the first store entry holds a youngest store instruction older than the first load instruction in program order, wherein a store address of the youngest store instruction included within the plurality of uncommitted store instructions matches a first load address of the first load instruction.

13. The load-store unit as recited in claim 12, wherein the load-store unit further configured to:
perform said setting of the retry bit and said storing of the store index in a first clock cycle responsive to said determination; and
perform said forwarding of bypass data to the load instruction in a second clock cycle responsive to said detection.

14. The load-store unit as recited in claim 12, wherein the store index is an entry number of the store buffer, and wherein the entry number corresponds to the first store entry.

15. The load-store unit as recited in claim 11, wherein the load-store unit further comprises a priority encoder, wherein the priority encoder is configured to utilize age information in the store buffer to determine said youngest store instruction from one or more address matching store instructions, each address matching store instruction having a same address as a first load address corresponding to the first load instruction.

16. The load-store unit as recited in claim 15, wherein an entry of the first plurality of entries is further configured to store one or more of a valid bit, a retry bit, a store buffer index, and an indication of age and an address of an uncommitted load instruction.

17. The load-store unit as recited in claim 16, wherein the entry of the second plurality of entries is further configured to store one or more of a valid bit, a store buffer index, and an indication of age, an address, and data of an uncommitted store instruction.

* * * * *